US012025299B2

(12) United States Patent
Koizumi et al.

(10) Patent No.: US 12,025,299 B2
(45) Date of Patent: Jul. 2, 2024

(54) BENDING SYSTEM AND METHOD FOR USING THE SAME

(71) Applicant: AMADA CO., LTD., Kanagawa (JP)

(72) Inventors: Norihisa Koizumi, Kanagawa (JP); Yuto Nishihata, Kanagawa (JP); Satoshi Takatsu, Kanagawa (JP)

(73) Assignee: AMADA CO., LTD., Kanagawa (JP)

( * ) Notice: Subject to any disclaimer, the term of this patent is extended or adjusted under 35 U.S.C. 154(b) by 21 days.

(21) Appl. No.: 17/926,585

(22) PCT Filed: May 14, 2021

(86) PCT No.: PCT/JP2021/018424
§ 371 (c)(1),
(2) Date: Nov. 19, 2022

(87) PCT Pub. No.: WO2021/235350
PCT Pub. Date: Nov. 25, 2021

(65) Prior Publication Data
US 2023/0184417 A1 Jun. 15, 2023

(30) Foreign Application Priority Data
May 22, 2020 (JP) ................................ 2020-089699

(51) Int. Cl.
*F21V 21/30* (2006.01)
*B21D 5/00* (2006.01)
(Continued)

(52) U.S. Cl.
CPC .............. *F21V 21/30* (2013.01); *B21D 5/002* (2013.01); *B21D 5/0209* (2013.01);
(Continued)

(58) Field of Classification Search
CPC ....... B21D 43/003; B21D 5/002; F21V 21/30; F21V 21/34; F21S 2/00; F21S 2/005
See application file for complete search history.

(56) References Cited

U.S. PATENT DOCUMENTS 5,800,048 A * 9/1998 Gordin .................. F21V 7/0016
362/346
2022/0335642 A1 * 10/2022 Kubota ..................... G06T 7/60
(Continued)

FOREIGN PATENT DOCUMENTS

CN 107617836 A 1/2018
CN 110930799 A 3/2020
(Continued)

OTHER PUBLICATIONS

International Search Report for corresponding Application No. PCT/JP2021/018424, mailed Jul. 13, 2021.
(Continued)

*Primary Examiner* — William N Harris
(74) *Attorney, Agent, or Firm* — Renner, Otto, Boisselle & Sklar, LLP

(57) ABSTRACT

In a bending system and a method for using the same, the bending system includes a bending robot provided between a press brake and a predetermined setting area that is arranged in front of the press brake to assist in bending a workpiece. The bending robot includes a robot hand for holding the workpiece on a pallet that is set in the predetermined setting area. An image pickup unit, which picks up an image of the workpiece on the pallet from an oblique upper direction, is provided above and anterior to the predetermined setting area. A first illumination unit, which illuminates an image pickup area of the image pickup unit, is erected on a left front side of the predetermined setting area. A second illumination stand, which illuminates the
(Continued)

image pickup area of the image pickup unit, is erected on a right front side of the predetermined setting area.

7 Claims, 19 Drawing Sheets

(51) Int. Cl.
    *B21D 5/02*     (2006.01)
    *B21D 43/00*     (2006.01)
    *B25J 11/00*     (2006.01)
    *F21S 2/00*     (2016.01)
    *F21V 21/34*     (2006.01)
    *F21W 131/403*     (2006.01)
    *F21Y 105/16*     (2016.01)
    *F21Y 115/10*     (2016.01)

(52) U.S. Cl.
    CPC ......... *B21D 5/0281* (2013.01); *B21D 43/003* (2013.01); *B25J 11/005* (2013.01); *F21S 2/00* (2013.01); *F21V 21/34* (2013.01); *F21W 2131/403* (2013.01); *F21Y 2105/16* (2016.08); *F21Y 2115/10* (2016.08)

(56) References Cited

U.S. PATENT DOCUMENTS

| | | | | |
|---|---|---|---|---|
| 2022/0414843 | A1* | 12/2022 | Takatsu | ..................... G06T 7/73 |
| 2023/0390919 | A1* | 12/2023 | Takatsu | ..................... B25J 9/10 |

FOREIGN PATENT DOCUMENTS

| | | | |
|---|---|---|---|
| JP | 10-106309 | A | 4/1998 |
| JP | 2002-13913 | A | 1/2002 |
| JP | 2006-107921 | A | 4/2006 |
| JP | 2009-117315 | A | 5/2009 |
| JP | 2016-117315 | A | 5/2009 |
| JP | 2013-101793 | A | 5/2013 |
| JP | 2015-13303 | A | 1/2015 |
| JP | 2016-135512 | A | 7/2016 |
| JP | 2017-124469 | A | 7/2017 |
| JP | 2018-120388 | A | 8/2018 |
| JP | 2018-126758 | A | 8/2018 |
| JP | 2019-14027 | A | 1/2019 |

OTHER PUBLICATIONS

Written Opinion for corresponding Application No. PCT/JP2021/018424, mailed Jul. 13, 2021.

Extended European Search Report for corresponding EP Application No. 21808123.0 issued Oct. 11, 2023.

* cited by examiner

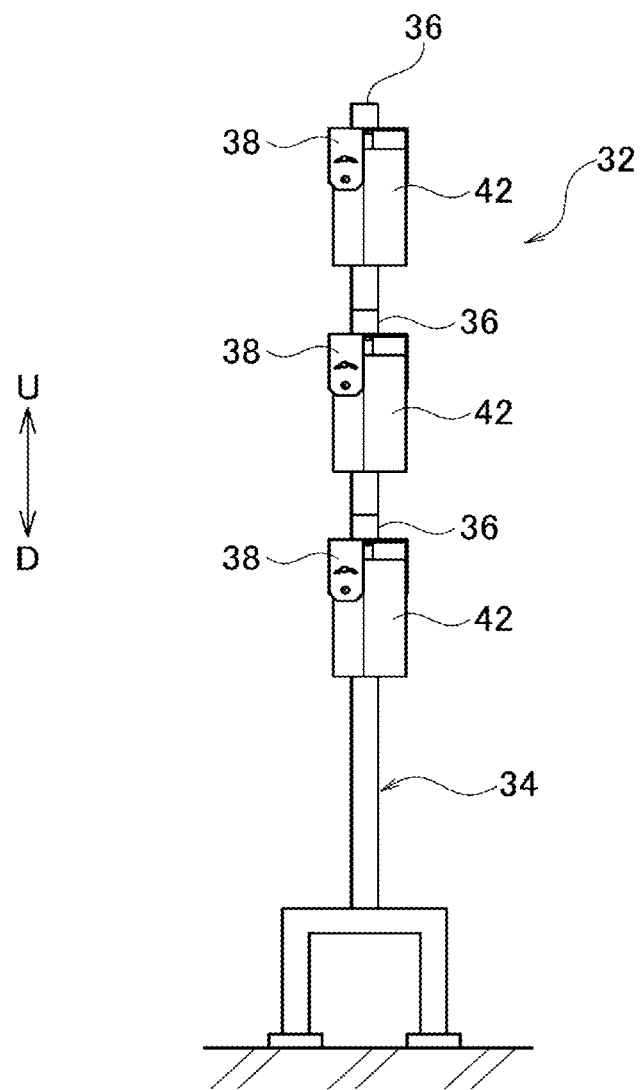

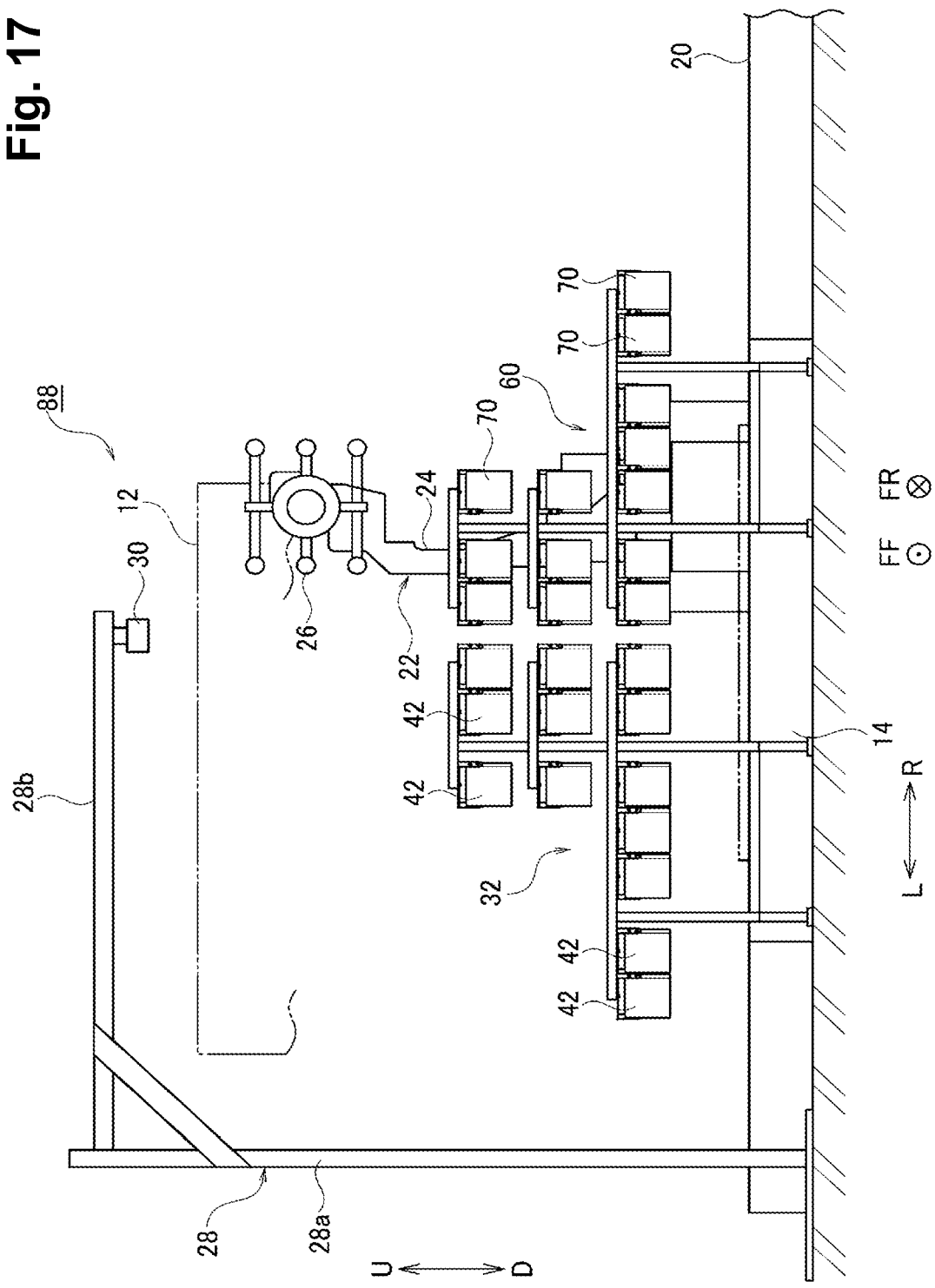

BENDING SYSTEM AND METHOD FOR USING THE SAME

TECHNICAL FIELD

The present invention relates to a bending system that automatically bends a plate-shaped workpiece and a method for using the same.

BACKGROUND ART

In recent years, bending systems have become widespread in the field of sheet metal processing. Hereinafter, the configuration and the like of the bending system will be briefly described (see Patent Literature 1).

The bending system includes a press brake that bends a workpiece. A bending robot that assists in bending the workpiece is provided between the press brake and a predetermined setting area that is arranged in front of the press brake. The bending robot includes a robot hand that holds the workpiece on a pallet set in the predetermined setting area. Further, above the predetermined setting area, a camera as an image pickup unit that picks up an image of the workpiece on the pallet from a vertically upper direction is provided. A first illumination unit that irradiates an image pickup area of the camera with an illumination beam is provided in the vicinity of the left side of the predetermined setting area. A second illumination unit that irradiates the image pickup area of the camera with an illumination beam is provided in the vicinity of the right side of the predetermined setting area.

The bending system includes a numerical control device that controls the press brake, a robot control device that controls the bending robot, and an image processing device that performs image processing to a picked-up image from the camera. The image processing device detects a location of the workpiece on the palette based on the picked-up image from the camera. Based on the detected location of the workpiece, the robot control device controls the bending robot such that the robot hand holds a predetermined portion of the workpiece. Therefore, even if the workpiece is not placed accurately at a predetermined position on the pallet, it is possible to sufficiently ensure the processing accuracy of the bending by appropriately operating the bending robot.

Note that as related prior arts, in addition to Patent Literature 1, there are those shown in Patent Literatures 2 to 4.

CITATION LIST

Patent Literature

Patent Literature 1: Japanese Patent Application Laid-Open Publication No. 2018-120388
Patent Literature 2: Japanese Patent Application Laid-Open Publication No. 2017-124469
Patent Literature 3: Japanese Patent Application Laid-Open Publication No. 2015-13303
Patent Literature 4: Japanese Patent Application Laid-Open Publication No. 2019-14027

SUMMARY

Now, in the conventional bending system, the camera is located above the predetermined setting area and is not sufficiently separated from the predetermined setting area. The two illumination units are located in the vicinity of the predetermined setting area and are not sufficiently separated from the predetermined setting area. As a result, in order to prevent a part of the bending robot and the workpiece held by the robot hand from interfering with the camera or the like, the operating range of the bending robot is limited, which often results in a case in which it is impossible to bend the workpiece. In other words, there is a problem that it is difficult to increase the degree of freedom of the processing of the bending system while sufficiently ensuring the processing accuracy of the bending.

A bending system according to a first embodiment of the present invention includes a bending robot provided between a press brake and a predetermined setting area arranged in front of the press brake, including a robot hand for holding a workpiece on a pallet set in the predetermined setting area, and configured to assist in bending the workpiece, and an image pickup unit provided above and anterior to the predetermined setting area and configured to pick up an image of the workpiece on the pallet from an oblique upper direction. The bending system according to the present embodiment includes a first illumination unit erected on a left front side of the predetermined setting area and configured to irradiate an image pickup area of the image pickup unit with an illumination beam, and a second illumination unit erected on a right front side of the predetermined setting area and configured to irradiate the image pickup area of the image pickup unit with the illumination beam.

In a bending system according to a second embodiment, in addition to the configuration of the bending system according to the first embodiment, the first illumination unit includes a plurality of first illuminations for irradiation of illumination beams in a right obliquely downward direction, and is configured such that an irradiation direction of each of the first illuminations is adjustable so that an entire area on the pallet is irradiated with the illumination beams from the plurality of first illuminations. Further, the second illumination unit includes a plurality of second illuminations for irradiation of illumination beams in a left obliquely downward direction, and is configured such that an irradiation direction of each of the second illuminations is adjustable so that the entire area on the pallet is irradiated with the illumination beams from the plurality of second illuminations.

According to the configurations of the bending system according to the first embodiment and the second embodiment, as described above, since the image pickup unit is located above and anterior to the predetermined setting area, the image pickup unit can be sufficiently separated from the predetermined setting area. Since the first illumination unit is located on the left front side of the predetermined setting area and the second illumination unit is located on the right front side of the predetermined setting area, the first illumination unit and the second illumination unit can be sufficiently separated from the predetermined setting area. Therefore, the workpiece held by the part of the bending robot or the robot hand does not interfere with the image pickup unit, the first illumination unit, or the second illumination unit. Therefore, the operating range of the bending robot is not limited by the image pickup unit and the like.

A method for using a bending system according to a third embodiment is a method for using the bending system according to the second embodiment. Then, in a state in which an entire area on the pallet is covered with an adjustment sheet, the irradiation direction of each of the first illuminations is adjusted such that a position on the adjustment sheet is irradiated with a visible beam from a laser pointer of an adjustment jig mounted to each of the first illuminations, the position on the adjustment sheet corresponding to an irradiation range of a respective one of the first illuminations. Further, an irradiation direction of each of the second illuminations is adjusted such that a position on the adjustment sheet is irradiated with the visible beam from the laser pointer of the adjustment jig mounted to each of the second illuminations, the position on the adjustment sheet corresponding to an irradiation range of a respective one of the second illuminations.

A method for using a bending system according to a fourth embodiment is a method for using the bending system according to the second embodiment. Then, when the image pickup unit picks up an image of the workpiece on the pallet from the oblique upper direction, an illumination operation of the first illumination unit is executed so that the entire area on the pallet is irradiated with the illumination beams from the plurality of first illuminations. Further, an illumination operation of the second illumination unit is executed so that the entire area on the pallet is irradiated with the illumination beams from the plurality of second illuminations.

According to the bending system and the method for using the same described above, it is possible to increase the degree of freedom of the bending of the bending system while sufficiently ensuring the processing accuracy of the bending.

BRIEF DESCRIPTION OF DRAWINGS

FIG. 5B is a diagram of the first illumination stand seen from the right side of FIG. 5A.

FIG. 17 is a front view of the bending system according to the second embodiment.

DESCRIPTION OF EMBODIMENT

Figure 1:
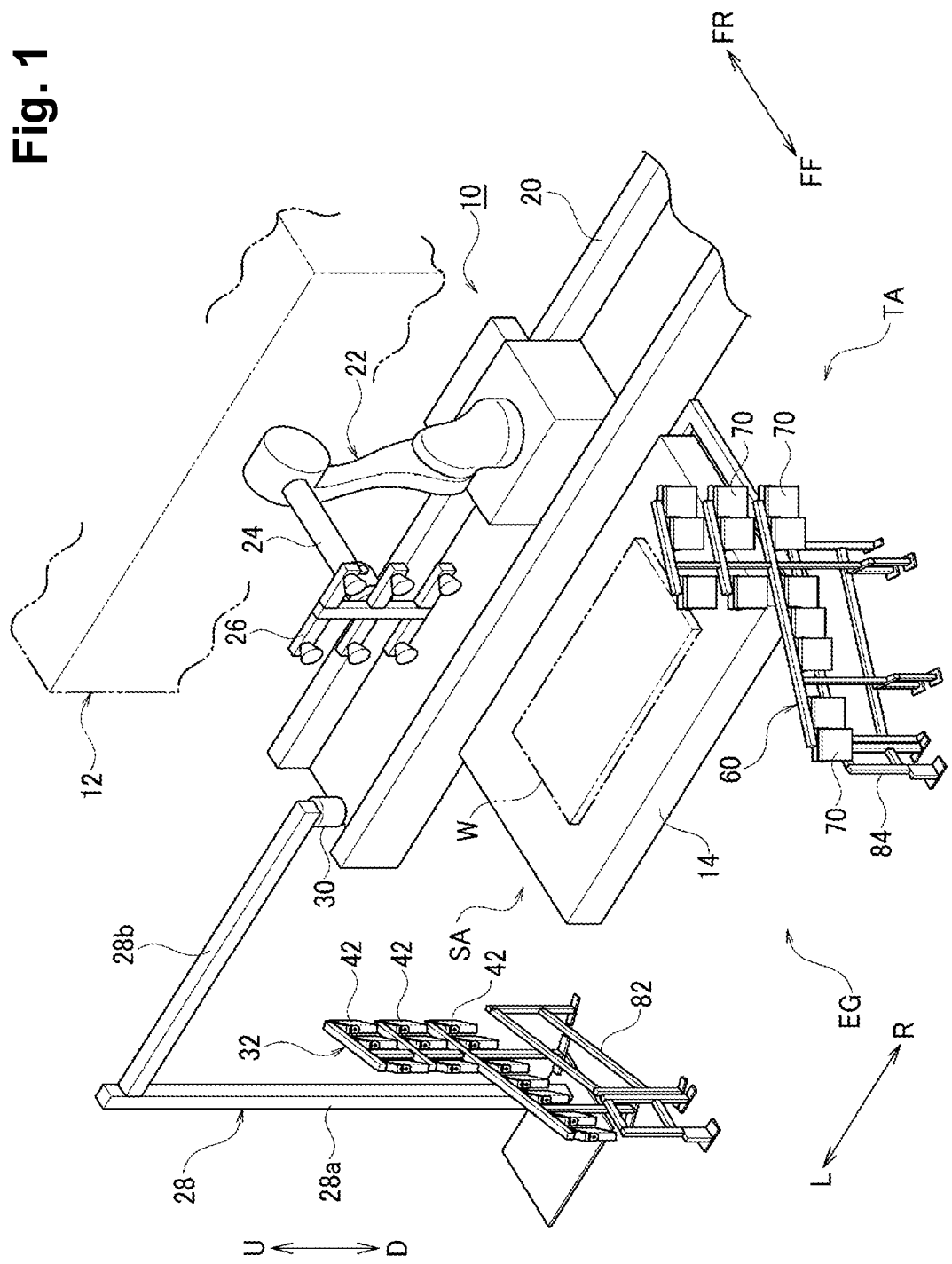
FIG. 1 is a perspective view of a bending system according to a first embodiment.

Hereinafter, a first embodiment and a second embodiment will be described with reference to FIGS. 1 to 17.

Note that in the description and the scope of claims of the present application, "provided" is meant to include not only directly provided but also indirectly provided via another member. "Erected" means being set up in an upright state. The "lateral direction" is one of the horizontal directions and is synonymous with a direction parallel to the width direction of the press brake. The "front-back direction" is a horizontal direction orthogonal to the lateral direction, and is synonymous with a direction parallel to the depth direction of the press brake. "Holding" is meant to include sucking and gripping. In the drawings, "FF" indicates a forward direction, "FR" indicates a backward direction, "L" indicates a left direction, "R" indicates a right direction, "U" indicates an upper direction, and "D" indicates a downward direction.

First Embodiment

Figure 2:
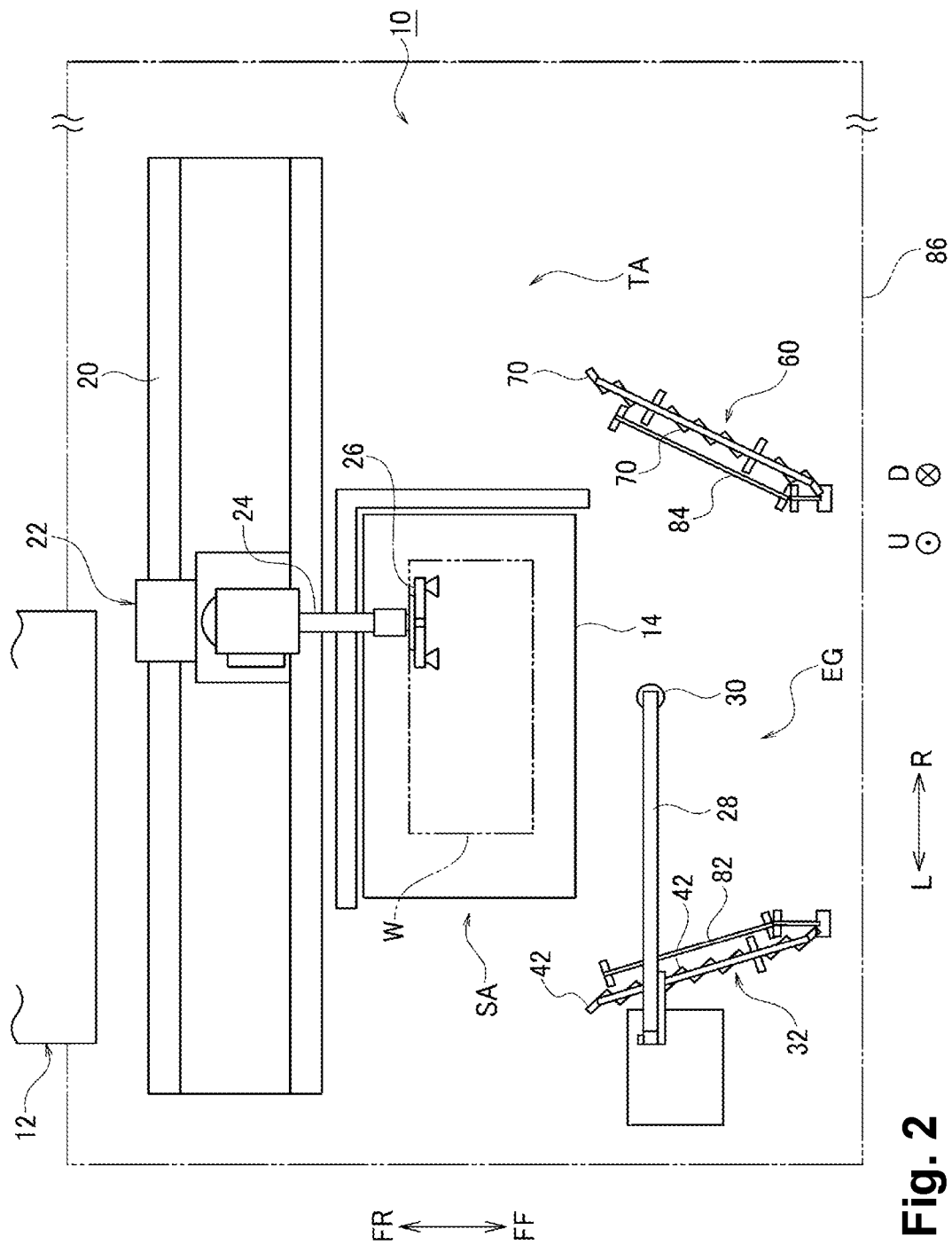
FIG. 2 is a plan view of the bending system according to the first embodiment.
Figure 3:
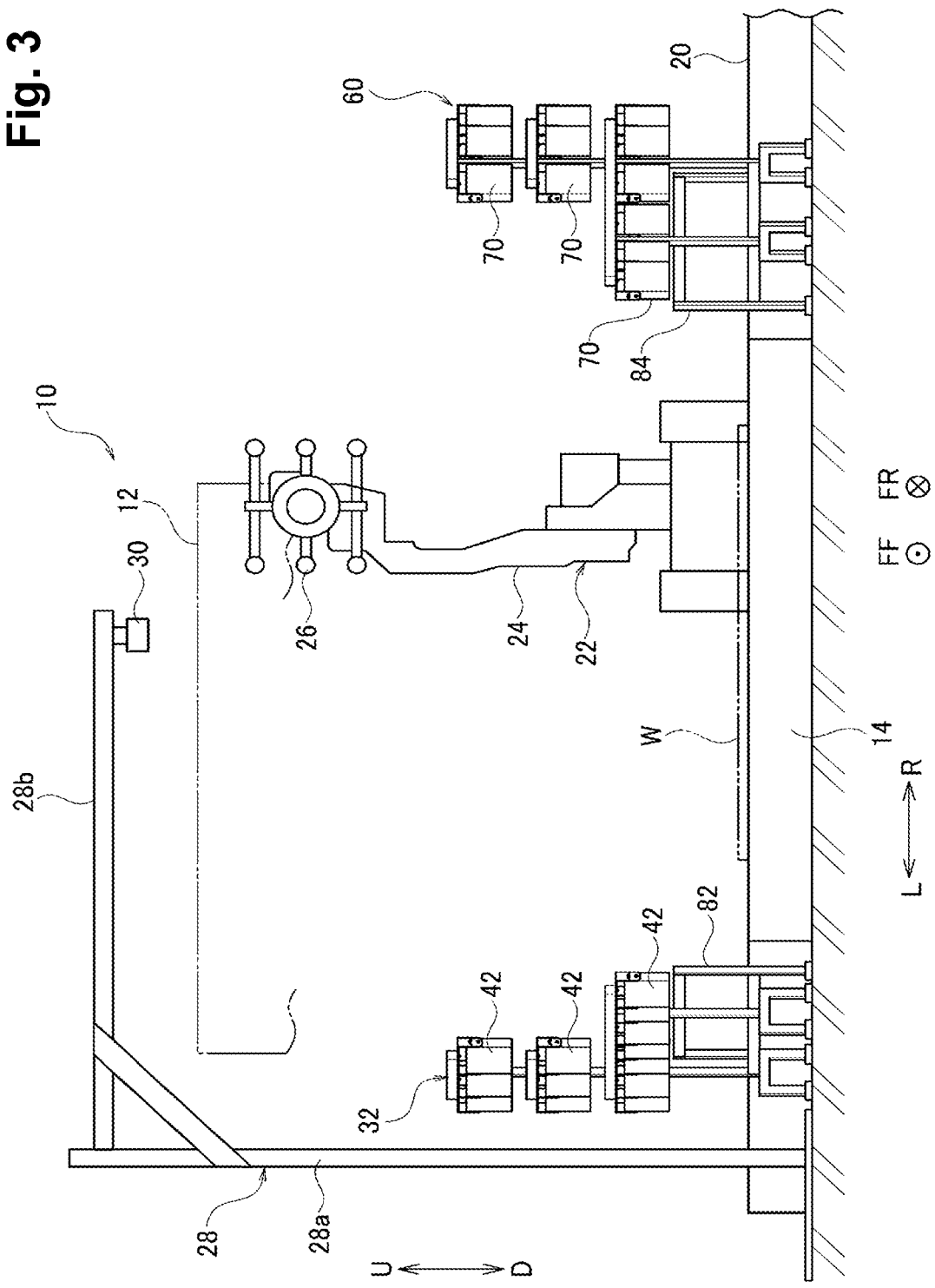
FIG. 3 is a front view of the bending system according to the first embodiment.

As shown in FIGS. 1 to 3, a bending system 10 according to the first embodiment is a processing system that automatically bends a plate-shaped workpiece (sheet metal) W. The bending system 10 includes a press brake 12 that bends the workpiece W through cooperation between a punch tool (not shown) and a die tool (not shown).

A predetermined setting area (carrying-in area) SA for a pallet 14 to be set is formed in front of the press brake 12. The pallet 14 supports the workpiece W. In other words, in front of the press brake 12, the carrying-in area SA for carrying in the workpiece W into the bending system 10 via the pallet 14 is formed. The pallet 14 is set in the predetermined setting area SA by a fork lifter (not shown) or a hand lifter (not shown). Note that on the right side of the predetermined setting area, a carrying-out area TA for carrying out a bent product from the bending system 10 via a product pallet (not shown) is formed.

Figure 4:
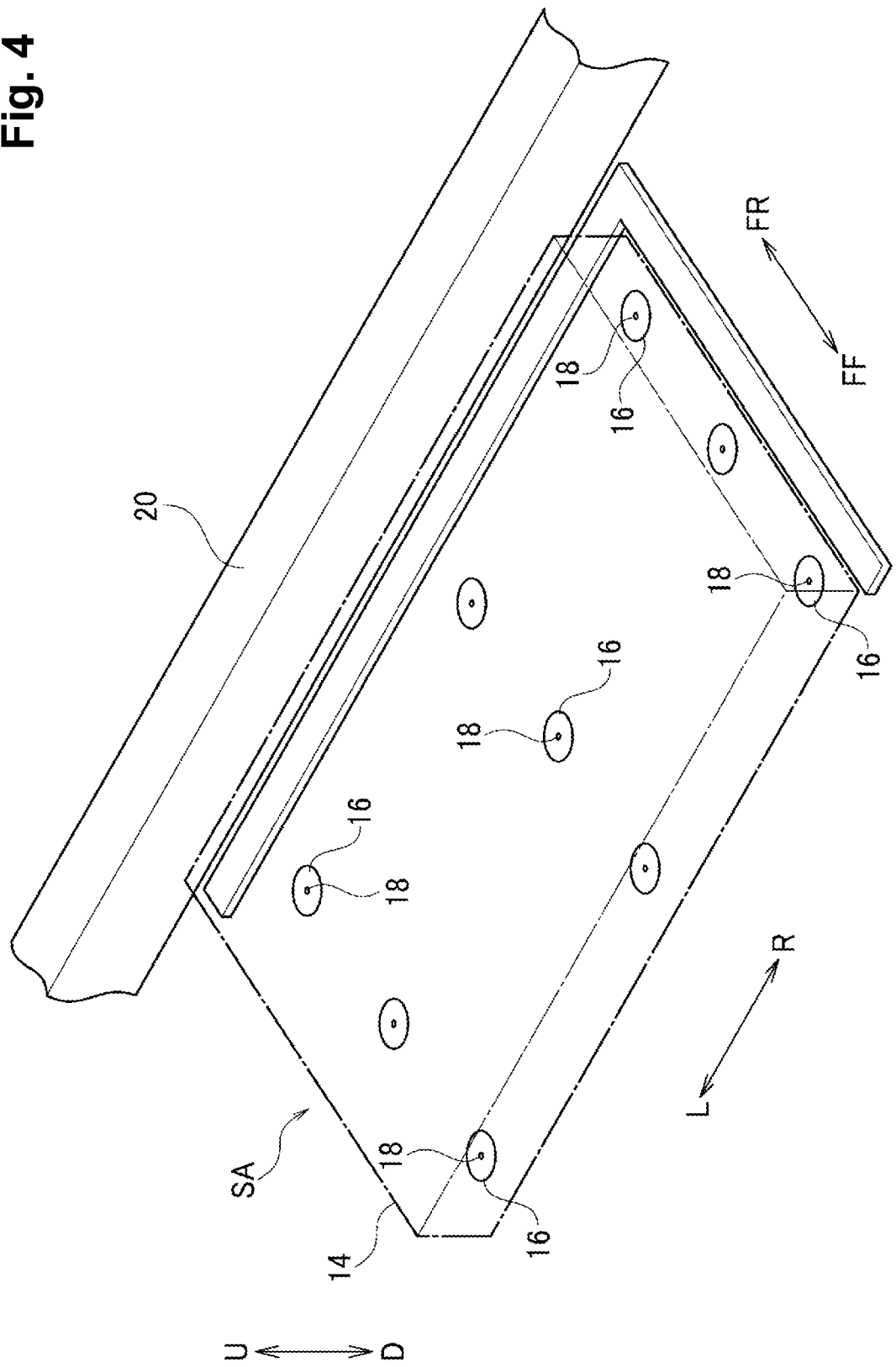
FIG. 4 is a perspective view showing a plurality of pedestals provided in a predetermined setting area.
Figure 5A:
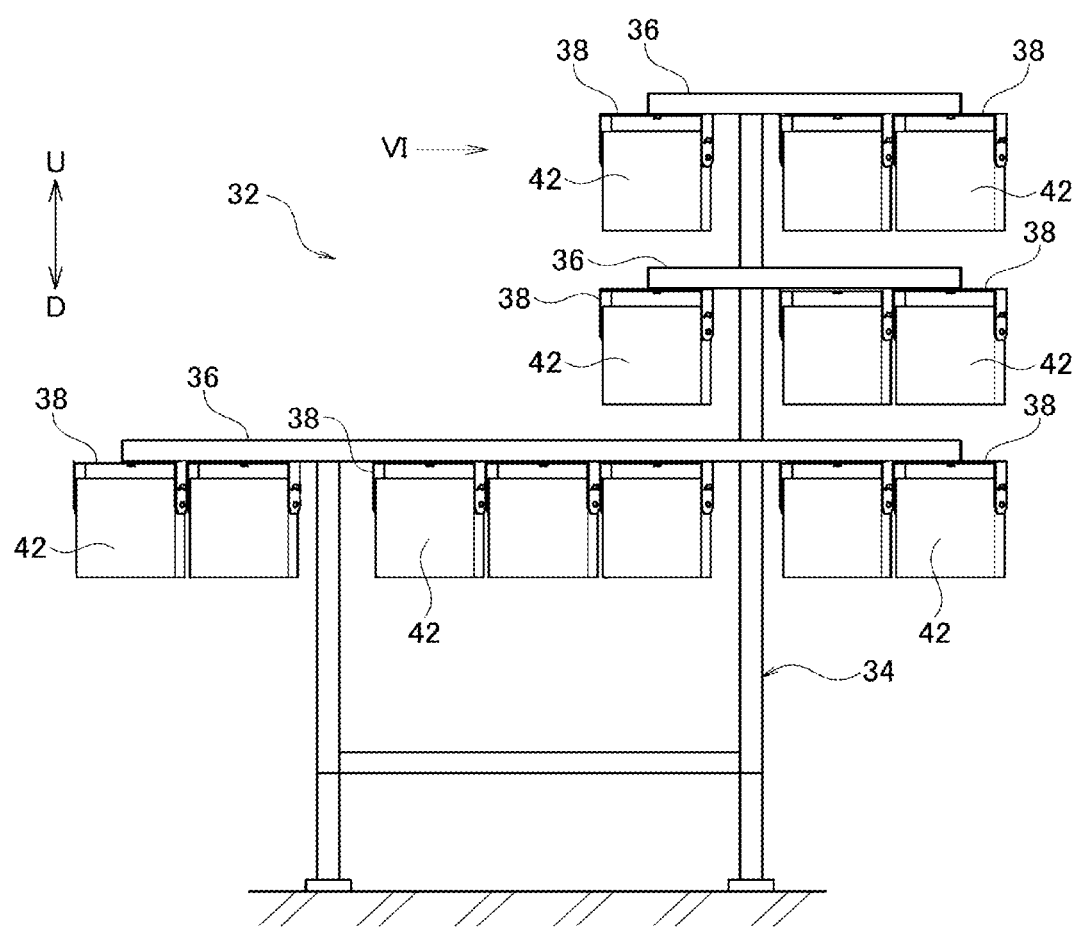
FIG. 5A is a diagram of a first illumination stand seen from the opposite side (back side) of the irradiation side.
Figure 6:
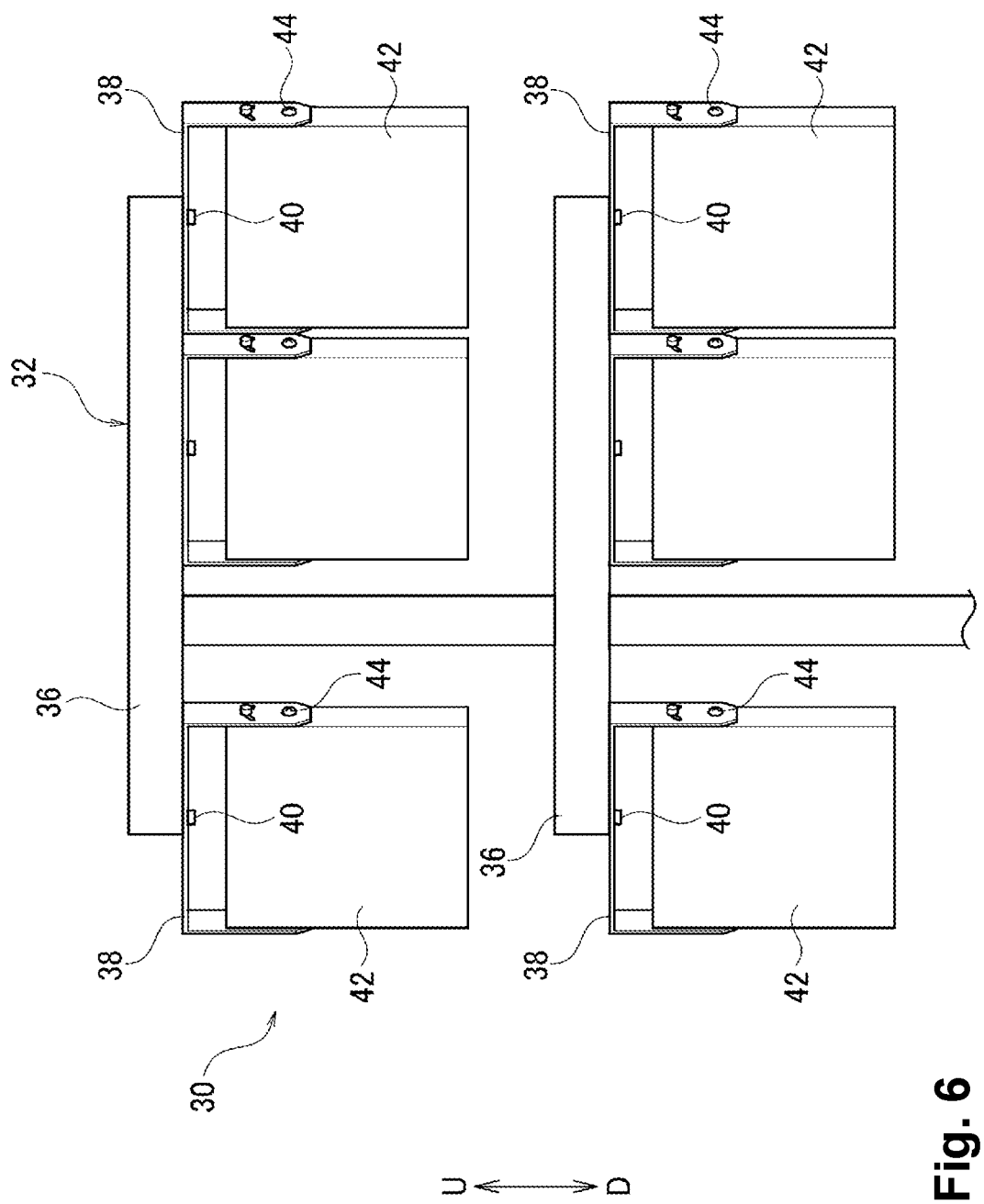
FIG. 6 is an enlarged view of a VI portion in FIG. 5A.
Figure 7A:
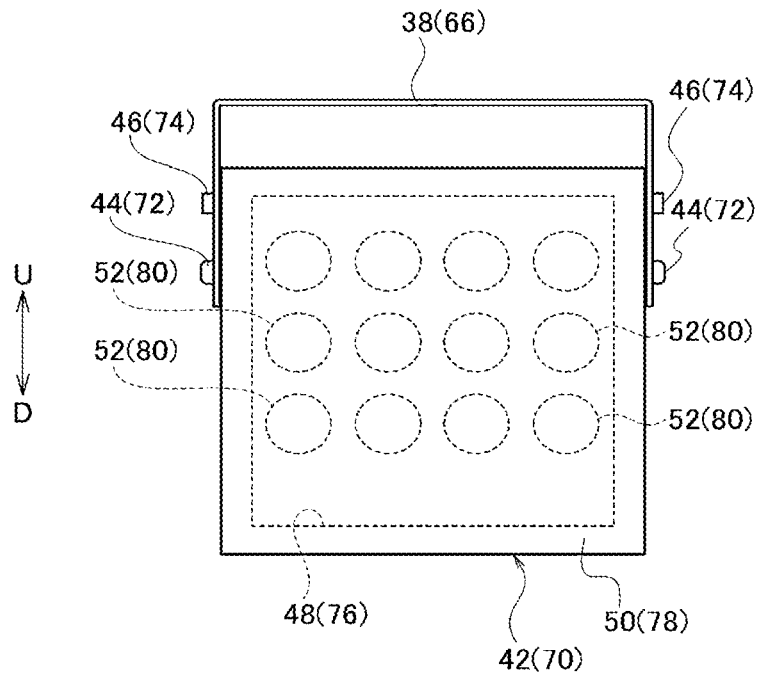
FIG. 7A is a diagram of an illumination (a first illumination or a second illumination) attached with a bracket, which is seen from the irradiation side (front side).
Figure 7B:
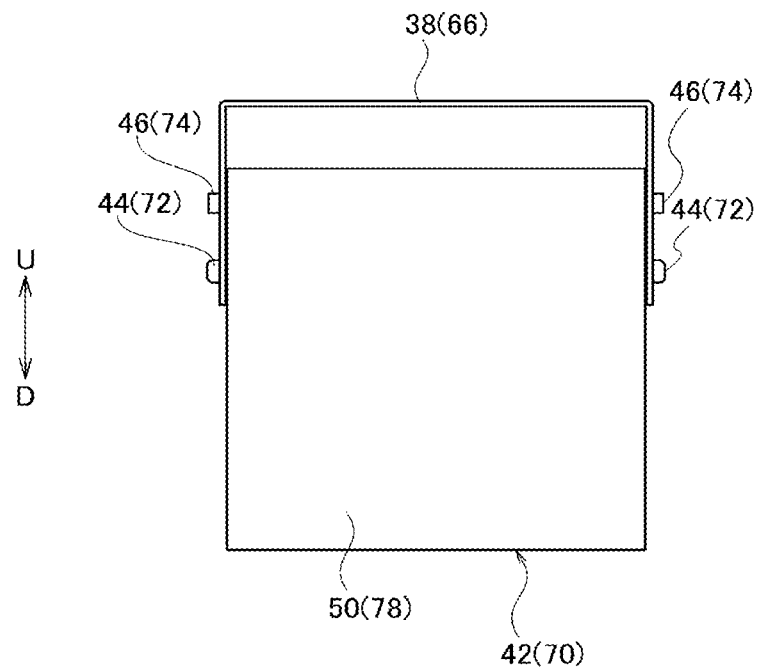
FIG. 7B is a diagram of the illumination attached with the bracket, which is seen from the opposite side of the irradiation side.
Figure 8A:
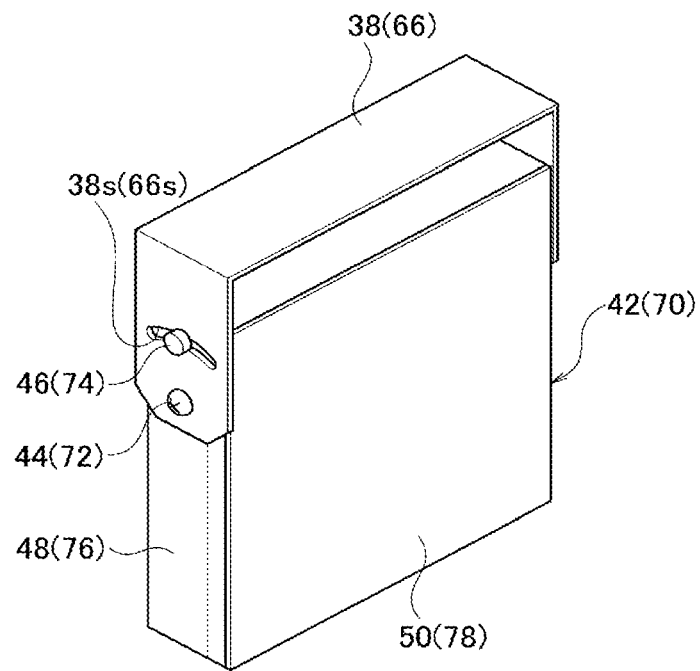
FIG. 8A is a perspective view of the illumination attached with the bracket.
Figure 8B:
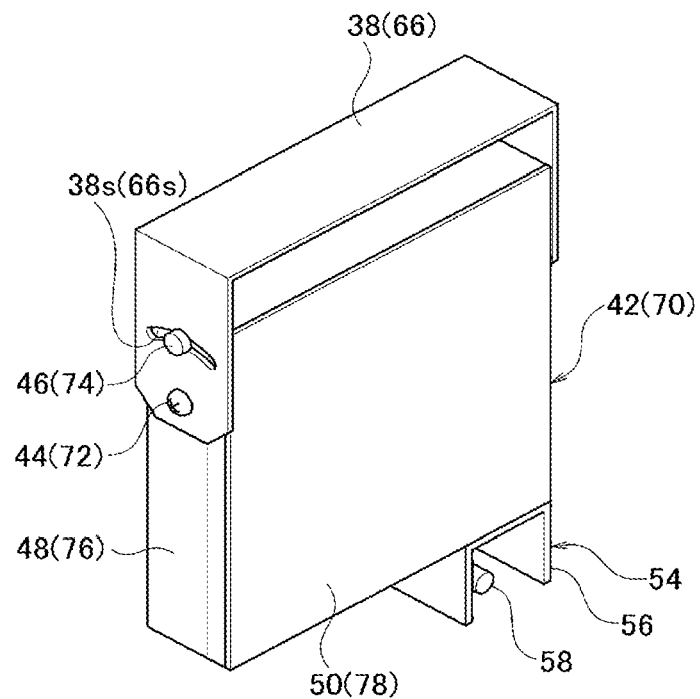
FIG. 8B is a perspective view of the illumination attached with the bracket and shows a state in which an adjustment jig is mounted to the illumination attached with the bracket.

As shown in FIGS. 1 and 4, a plurality of pedestals 16 that support the pallet 14 are provided on a floor surface of the predetermined setting area SA via a plurality of low head bolts 18 and a plurality of anchors (not shown). A plurality of half-split shims (not shown) for adjusting a height location of each of the pedestals 16 are interposed between each of the pedestals 16 and the floor surface. Therefore, by adjusting the height location of each of the pedestals 16, it is possible to sufficiently ensure flatness of an upper surface of the pallet 14 set in the predetermined setting area SA.

As shown in FIGS. 1 to 3, a guide frame 20 extending in the lateral direction is provided between the press brake 12 and the predetermined setting area SA. A bending robot 22, which assists in bending the workpiece W, is provided to the guide frame 20 in such a manner as to be movable in the lateral direction. In other words, the bending robot 22 is provided between the press brake 12 and the predetermined setting area SA in such a manner as to be movable via the guide frame 20 in the lateral direction. The bending robot 22 has a known configuration shown in Patent Literature 2, for example, and includes an articulated robot arm 24. The bending robot 22 includes a robot hand 26 that is provided at the distal end of the robot arm 24 in an installable and removeable manner. The robot hand 26 sucks the workpiece W on the pallet 14 set in the predetermined setting area SA. Note that as shown in Patent Literatures 3 and 4, the robot hand 26 may include a gripper (not shown) that grips the end portion of the workpiece W.

An L-shaped support column 28 is erected on the floor surface on a left front side of the predetermined setting area SA, and the support column 28 includes a vertical portion (a perpendicular portion) 28a and a horizontal portion 28b that is provided above the vertical portion 28a. At the distal end of the horizontal portion 28b of the support column 28, a monocular camera 30 is provided as an image pickup unit that picks up, from an oblique upper direction, an image of the workpiece W on the pallet 14 set in the predetermined setting area SA. In other words, the camera 30 is provided above and anterior to the predetermined setting area SA via the support column 28. The camera 30 includes a CCD (Charge Coupled Device) or a CMOS (Complementary Metal Oxide Semiconductor) as an image pickup element. Note that a stereo camera (not shown) may be used in lieu of the monocular camera 30.

As shown in FIGS. 1 to 3, a first illumination stand 32, as a first illumination unit that irradiates an image pickup area of the camera 30 with an illumination beam, is erected on the left front side of the predetermined setting area SA. The first illumination stand 32 is arranged to be inclined with respect to the lateral direction so that a right end side thereof is located more forward than a left end side thereof. Then, the specific contents of the respective constituent members of the first illumination stand 32 are as follows.

As shown in FIGS. 1, 3, 5A, 5B, and 6, a first support frame 34 is erected on the left front side of the predetermined setting area SA. The first support frame 34 includes a plurality of (three in the present embodiment) first beam members 36 that extend in the horizontal direction. Each of the first beam members 36 is provided with an inverted U-shaped first bracket 38 via a mounting bolt 40. The first bracket 38 is rotatable around an axial center of the mounting bolt 40 that is a vertical axial center.

A first illumination 42 for irradiation of the illumination beam in a right obliquely downward direction is provided to each of the first brackets 38 via a mounting bolt 44. In other words, the first illumination stand 32 includes a plurality of (13 in the present embodiment) first illuminations 42. The illumination beams from the plurality of first illuminations 42 cast shadows on the right and rear edge portions (contour portions) of the workpiece W on the pallet 14 set in the predetermined setting area SA to clarify those edge portions.

As shown in FIGS. 6 to 9, each of the first illuminations 42 is rotatable around the axial center of the mounting bolt 44 that is a horizontal axial center. Each of the first illuminations 42 is rotatable around the axial center of the mounting bolt 40 integrally with the first bracket 38. A circular arc slit 38s is formed on each side surface of each of the first brackets 38. A movable bolt 46 as a movable element is provided on each side surface of each of the first illuminations 42, and each of the movable bolts 46 moves in a state of being guided to the slit 38s of each of the first brackets 38. Further, each of the first illuminations 42 includes a rectangular box-shaped illumination main body 48 provided to each of the first brackets 38 and whose front side (irradiation side) is open, an acrylic panel 50 provided on the front side of the illumination main body 48, and a plurality of light emitting diodes (LEDs) 52 provided in the illumination main body 48.

Figure 9:
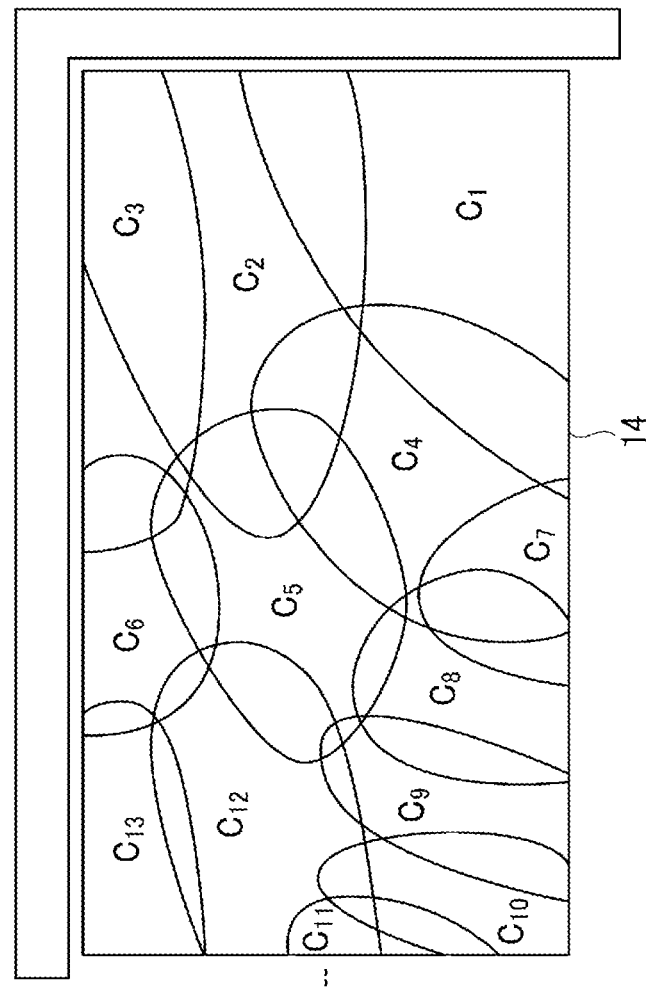
FIG. 9 is a diagram illustrating irradiation ranges of the respective first illuminations.
Figure 9:
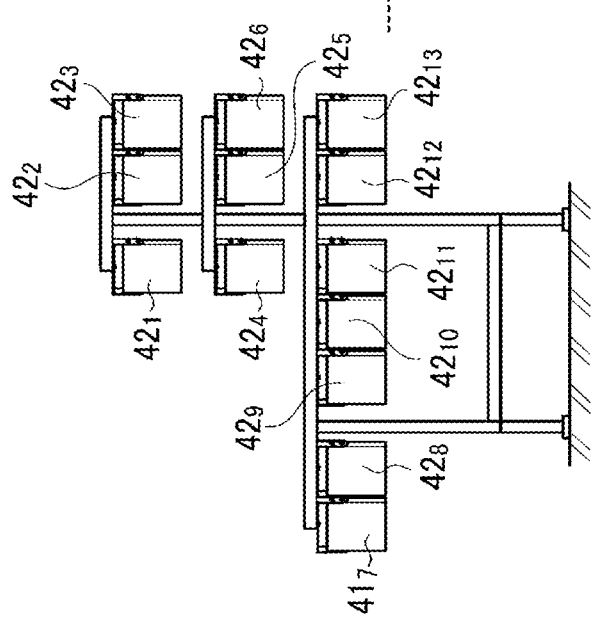
Figure 10A:
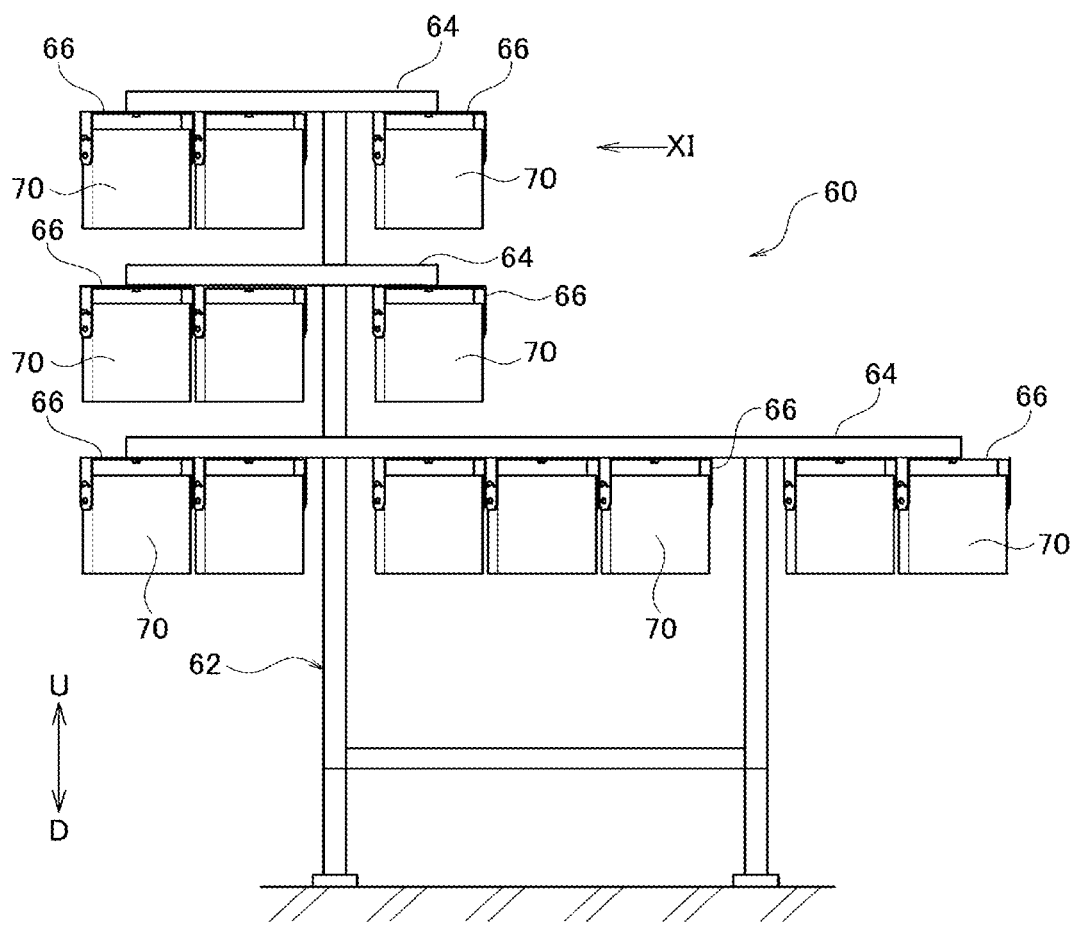
FIG. 10A is a diagram of a second illumination stand seen from the opposite side (back side) of the irradiation side.
Figure 10B:
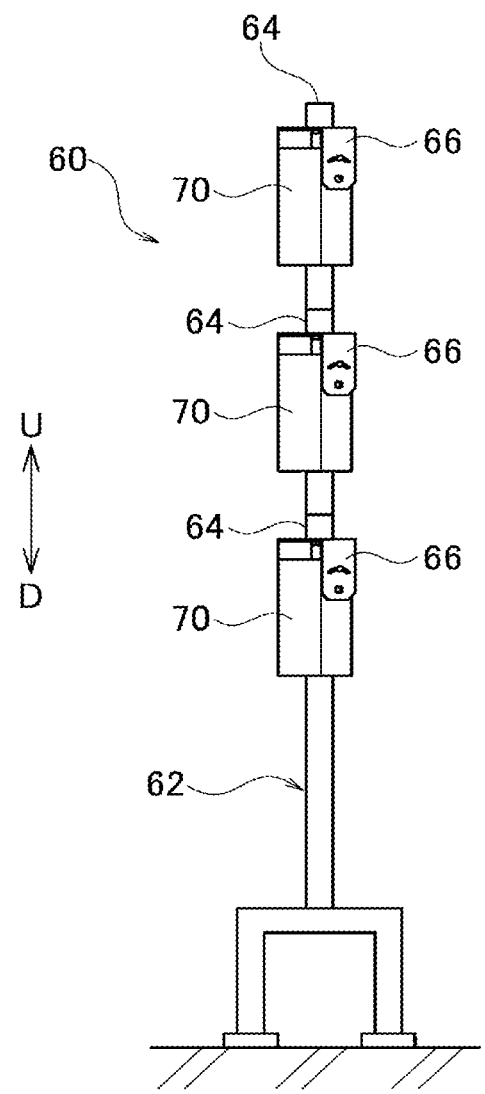
FIG. 10B is a diagram of the second illumination stand seen from the left side of FIG. 10A.
Figure 11:
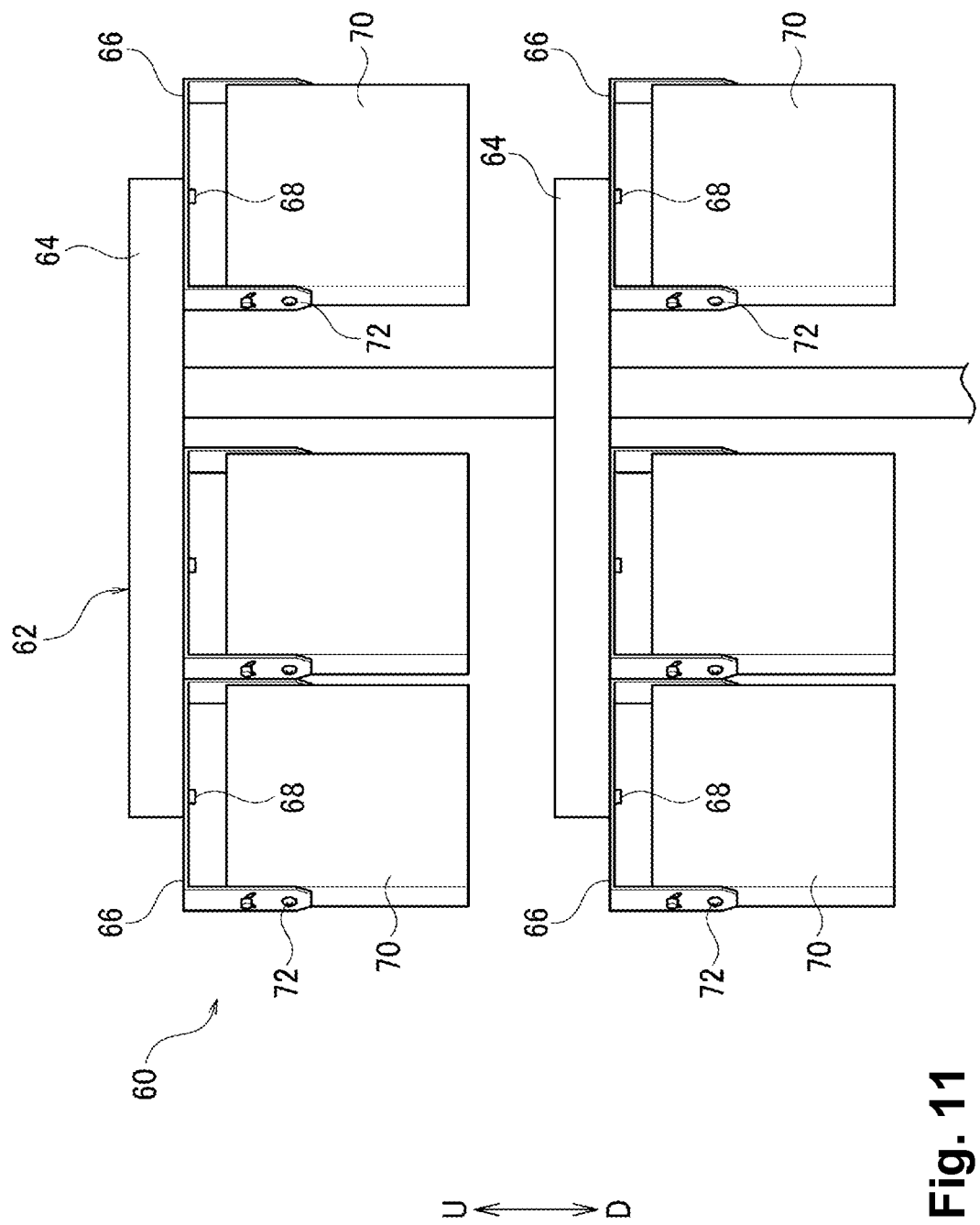
FIG. 11 is an enlarged view of an XI portion in FIG. 10A.

As described above, each of the first illuminations 42 is configured to be rotatable around the two orthogonal axial centers. In other words, the irradiation direction of each of the first illuminations 42 is configured to be adjustable so that an entire area on the pallet 14 is irradiated with the illumination beams from the plurality of first illuminations 42 (see FIG. 9). The two orthogonal axial centers refer to a horizontal axial center and a vertical axial center. In FIG. 9, each of the first illuminations 42 is attached with a numerical subscript for identification ($42_1$ to $42_{13}$). An irradiation range C of each of the first illuminations 42 is attached with a numerical subscript for identification ($C_1$ to $C_{13}$). Further, when the irradiation direction of each of the first illuminations 42 is adjusted, an adjustment jig 54 is used. The adjustment jig 54 includes a jig main body 56 that can be magnetically attached to an appropriate location of each of the illumination main bodies 48, and a laser pointer 58 that is provided to the jig main body 56 and emits a visible beam.

As shown in FIGS. 1 to 3, a second illumination stand 60, as a second illumination unit that irradiates the image pickup area of the camera 30 with the illumination beam, is erected on the right front side of the predetermined setting area SA. The second illumination stand 60 is arranged to be inclined with respect to the lateral direction so that a left end side thereof is located more forward than a right end side thereof. The second illumination stand 60 is separated from the first illumination stand 32 in the lateral direction, and a taking-in and out passage EG for taking in and out the pallet 14 with respect to the predetermined setting area SA is formed between the first illumination stand 32 and the second illumination stand 60. Then, the specific contents of the respective constituent members of the second illumination stand 60 are as follows.

As shown in FIGS. 1, 3, 10A, 10B, and 11, a second support frame 62 is erected on the right front side of the predetermined setting area SA. The second support frame 62 includes a plurality of (three in the present embodiment) second beam members 64 that extend in the horizontal direction. Each of the second beam members 64 is provided with an inverted U-shaped second bracket 66 via a mounting bolt 68. The second bracket 66 is rotatable around the axial center of the mounting bolt 68 that is a vertical axial center.

A second illumination 70 for irradiation of the illumination beam in a left obliquely downward direction is provided to each of the second brackets 66 via a mounting bolt 72. In other words, the second illumination stand 60 includes a plurality of (13 in the present embodiment) second illuminations 70. The plurality of second illuminations 70 cast shadows on the left and rear edge portions (contour portions) of the workpiece W on the pallet 14 set in the predetermined setting area SA to clarify those edge portions.

As shown in FIGS. 7A, 7B, 8A, 8B, and 10A to 12, each of the second illuminations 70 is rotatable around the axial center of the mounting bolt 72 that is a horizontal axial center. Each of the second illuminations 70 is rotatable around the axial center of the mounting bolt 68 integrally with the second bracket 66. A circular arc slit 66s is formed on each side surface of each of the second brackets 66. A movable bolt 74 as a movable element is provided on each side surface of each of the second illuminations 70, and each of the movable bolts 74 moves in a state of being guided to the slit 66s of each of the second brackets 66. Further, each of the second illuminations 70 includes a rectangular box-shaped illumination main body 76 provided to each of the second brackets 66 and whose front side (irradiation side) is open, an acrylic panel 78 provided on the front side of the illumination main body 76, and a plurality of light emitting diodes (LEDs) 80 provided in the illumination main body 76.

Figure 12:
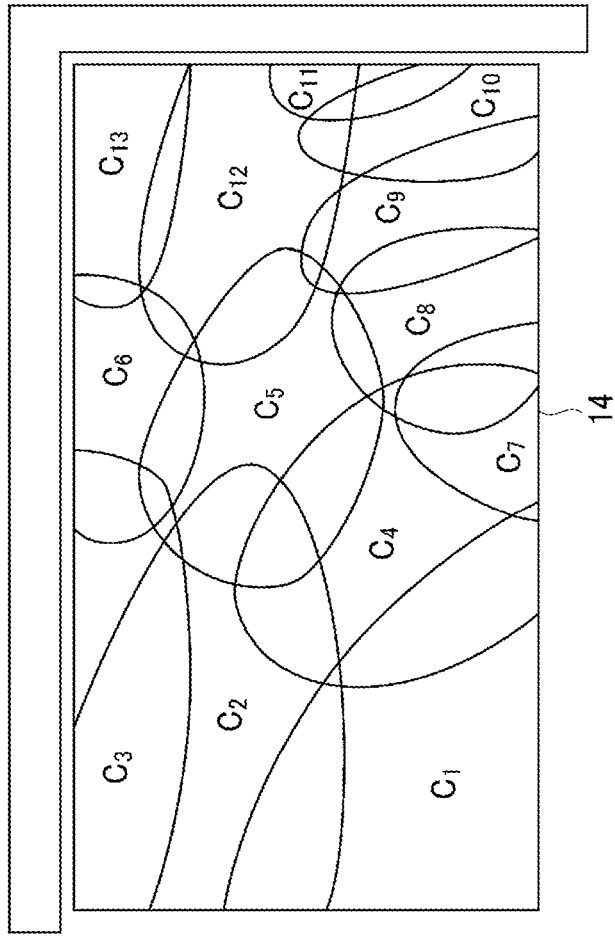
FIG. 12 is a diagram illustrating irradiation ranges of the respective second illuminations.
Figure 12:
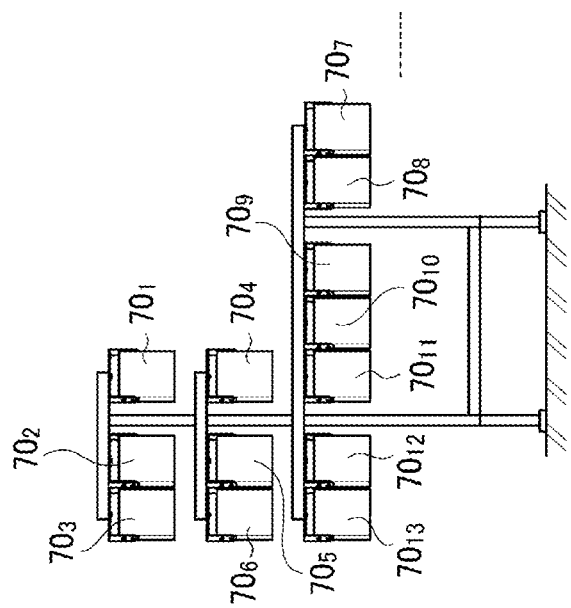

As described above, each of the second illuminations 70 is configured to be rotatable around the two orthogonal axial centers. In other words, the irradiation direction of each of the second illuminations 70 is configured to be adjustable so that the entire area on the pallet 14 set in the predetermined setting area SA is irradiated with the illumination beams from the plurality of second illuminations 70 (See FIG. 12). In FIG. 12, each of the second illuminations 70 is attached with a numerical subscript for identification ($70_1$ to $70_{13}$). The irradiation range C of each of the second illuminations 70 is attached with a numerical subscript for identification ($C_1$ to $C_{13}$). Further, when the irradiation direction of each of the second illuminations 70 is adjusted, the adjustment jig 54 is used as described above. The jig main body 56 of the adjustment jig 54 can be magnetically attached to an appropriate location of each of the illumination main bodies 76.

As shown in FIGS. 1 to 3, a first guard 82 that protects the first illumination stand 32 is provided in the vicinity of the right side of the first illumination stand 32. The first guard 82 is arranged to be along the first illumination stand 32. A second guard 84 that protects the second illumination stand 60 is provided in the vicinity of the left side of the second illumination stand 60. The second guard 84 is arranged to be along the second illumination stand 60. Further, a safety fence 86 for ensuring the safety of the bending is provided around most of the bending system 10. The safety fence 86 includes a plurality of doors (not shown) for allowing the fork lifter or the hand lifter to pass through.

Although not shown, the bending system 10 includes a numerical control device (a main control device) that controls the press brake 12, and a robot control device that controls the bending robot 22. The bending system 10 includes an illumination control device that controls the first illumination stand 32 and the second illumination stand 60, and an image processing device that performs image processing to a picked-up image of the camera 30. The illumination control device separately executes an irradiation operation of the illumination beams from the plurality of first illuminations 42 and an irradiation operation of the illumination beams from the plurality of second illuminations 70. The image processing device corrects a distortion of the picked-up image of the camera 30, which is caused by the inclination of the image pickup direction of the camera 30 with respect to the vertical direction. The image processing device detects the location of the workpiece W on the pallet 14 based on the corrected picked-up image of the camera 30. The robot control device controls the bending robot 22 so that the robot hand 26 holds a predetermined portion of the workpiece W based on the detected location of the workpiece W. Therefore, even if the workpiece W is not placed accurately at a predetermined position on the pallet 14, it is possible to sufficiently ensure the processing accuracy of the bending by appropriately operating the bending robot 22.

Next, a method for using the bending system according to the first embodiment will be described.

Figure 13:
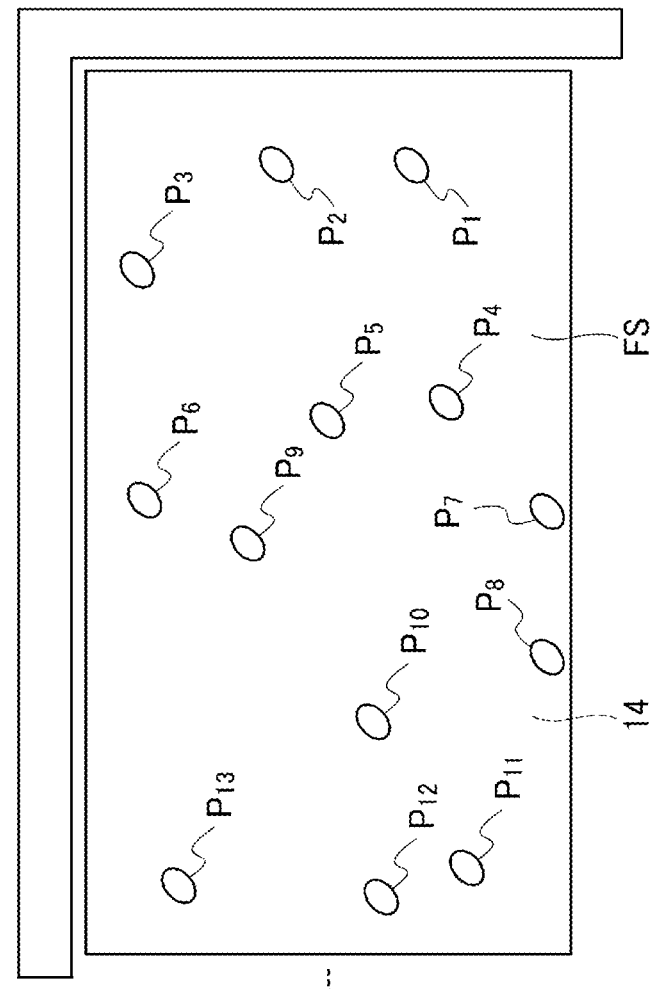
FIG. 13 is a diagram illustrating positions on an adjustment sheet, which correspond to the irradiation ranges of the respective first illuminations.
Figure 13:
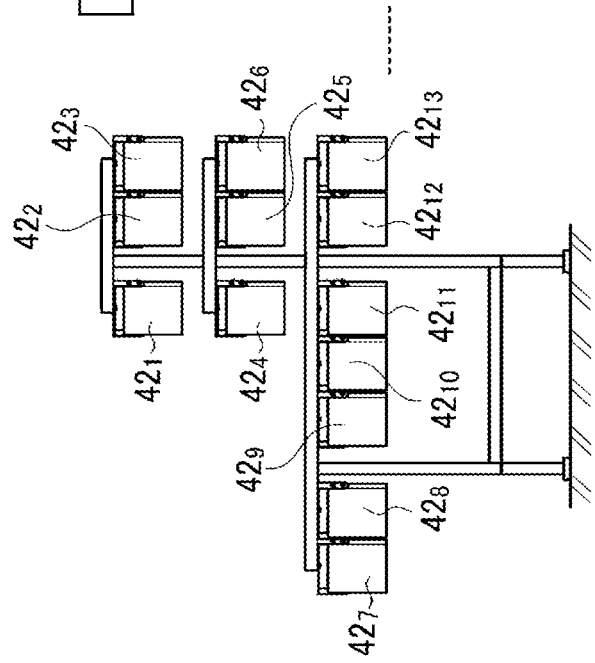

As shown in FIGS. 9 and 13, in a state in which the entire area of the pallet 14 is covered with a white adjustment sheet FS, the irradiation direction of each of the first illuminations 42 is adjusted such that a position P on the adjustment sheet FS, which corresponds to the irradiation range C of each of the first illuminations 42, is irradiated with the visible beam from the laser pointer 58 (see FIG. 8B) of the adjustment jig 54 mounted to each of the first illuminations 42. Thereby, the illumination beams of the first illumination stand 32 can be adjusted. In FIG. 13, each of the first illuminations 42 is attached with a numerical subscript for identification ($42_1$ to $42_{13}$). The position P corresponding to the irradiation range C ($C_1$ to $C_{13}$) of each of the first illuminations 42 ($42_1$ to $42_{13}$) is attached with a numerical subscript for identification ($P_1$ to $P_{13}$).

Figure 14:
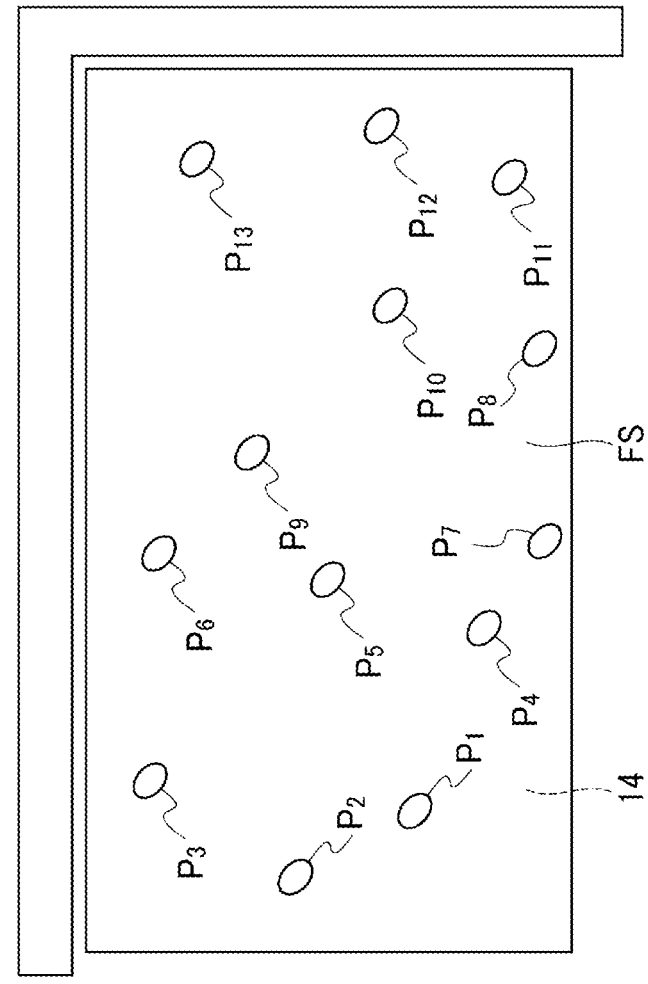
FIG. 14 is a diagram illustrating positions on the adjustment sheet, which correspond to the irradiation ranges of the respective second illuminations.
Figure 14:
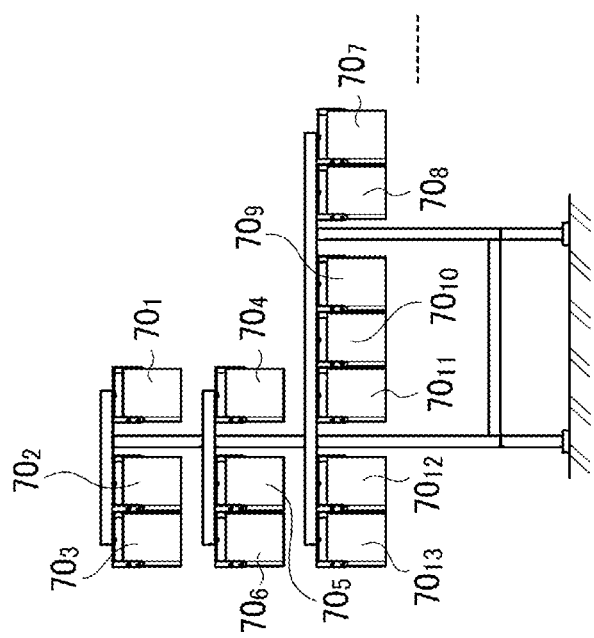

Further, as shown in FIGS. 12 and 14, in the state in which the entire area on the pallet 14 is covered with the adjustment sheet FS, the irradiation direction of each of the second illuminations 70 is adjusted such that the position P on the adjustment sheet FS, which corresponds to the irradiation range C of each of the second illuminations 70, is irradiated with the visible beam from the laser pointer 58 (see FIG. 8B) of the adjustment jig 54 mounted to each of the second illuminations 70. Thereby, the illumination beams of the second illumination stand 60 can be adjusted. In FIG. 14, each of the second illuminations 70 is attached with a numerical subscript for identification ($70_1$ to $70_{13}$). The position P corresponding to the irradiation range C ($C_1$ to $C_{13}$) of each of the second illuminations 70 ($70_1$ to $70_{13}$) is attached with a numerical subscript for identification ($P_1$ to $P_{13}$).

As shown in FIGS. 1 to 3, when the camera 30 picks up an image of the workpiece W on the pallet 14 from the oblique upper direction, an illumination operation of the first illumination stand 32 is executed so that the entire area on the pallet 14 is irradiated with the illumination beams from the plurality of first illuminations 42. Then, shadows can be casted on the right and rear edge portions of the workpiece W on the pallet 14 to clarify those edge portions. Since the illumination beams from the plurality of first illuminations 42 are directed in the right obliquely downward direction, the end surfaces of the left and front edge portions of the workpiece W on the pallet 14 can be recognized by the camera 30. Therefore, it is not necessary to cast shadows on those edge portions. Further, an illumination operation of the second illumination stand 60 is executed so that the entire area on the pallet 14 is irradiated with the illumination beams from the plurality of second illuminations 70. Then, shadows can be casted on the left and rear edge portions of the workpiece W on the pallet 14 to clarify those edge portions. Since the illumination beams from the plurality of second illuminations 70 are directed in the left obliquely downward direction, the end surfaces of the right and front edge portions of the workpiece W on the pallet 14 can be recognized by the camera 30. Therefore, it is not necessary to cast shadows on these edges. The execution timings of the illumination operation of the first illumination stand 32 and the illumination operation of the second illumination stand 60 are staggered. By clarifying the right, left, and rear edge portions of the workpiece W on the pallet 14, the image processing device can easily detect the location of the workpiece W by pattern matching.

Next, the operation and effect of the first embodiment will be described.

As described above, since the camera 30 is located above and anterior to the predetermined setting area SA, the camera 30 can be sufficiently separated from the predetermined setting area SA. Since the first illumination stand 32 is located on the left front side of the predetermined setting area SA and the second illumination stand 60 is located on the right front side of the predetermined setting area SA, the first illumination stand 32 and the second illumination stand 60 can be sufficiently separated from the predetermined setting area SA. Therefore, the workpiece W sucked by a part of the bending robot 22 or the robot hand 26 does not interfere with the camera 30, the first illumination stand 32, and the second illumination stand 60. In other words, the operating range of the bending robot 22 that sucks the workpiece W is not limited by the camera 30 or the like. Therefore, according to the first embodiment, it is possible to increase the degree of freedom of the bending of the bending system 10 while sufficiently ensuring the processing accuracy of the bending.

As described above, the first illumination stand 32 is arranged to be inclined with respect to the lateral direction so that the right end side thereof is located more forward than the left end side thereof. The second illumination stand 60 is arranged to be inclined with respect to the lateral direction so that the left end side thereof is located more forward than the right end side thereof. A taking-in and out passage EG is formed between the first illumination stand 32 and the second illumination stand 60. Therefore, it is possible to sufficiently ensure a worker flow line in the vicinity of the predetermined setting area SA while allowing the pallet 14 to be taken in and out with respect to the predetermined setting area SA. Therefore, according to the first embodiment, the workability and operability of the bending system 10 can be improved.

As described above, the first guard 82 is provided in the vicinity of the right side of the first illumination stand 32, and the second guard 84 is provided in the vicinity of the left side of the second illumination stand 60. Therefore, according to the first embodiment, damage to the first illumination stand 32 or the second illumination stand 60 due to contact with the fork lifter or the hand lifter can be sufficiently prevented.

Second Embodiment

Figure 15:
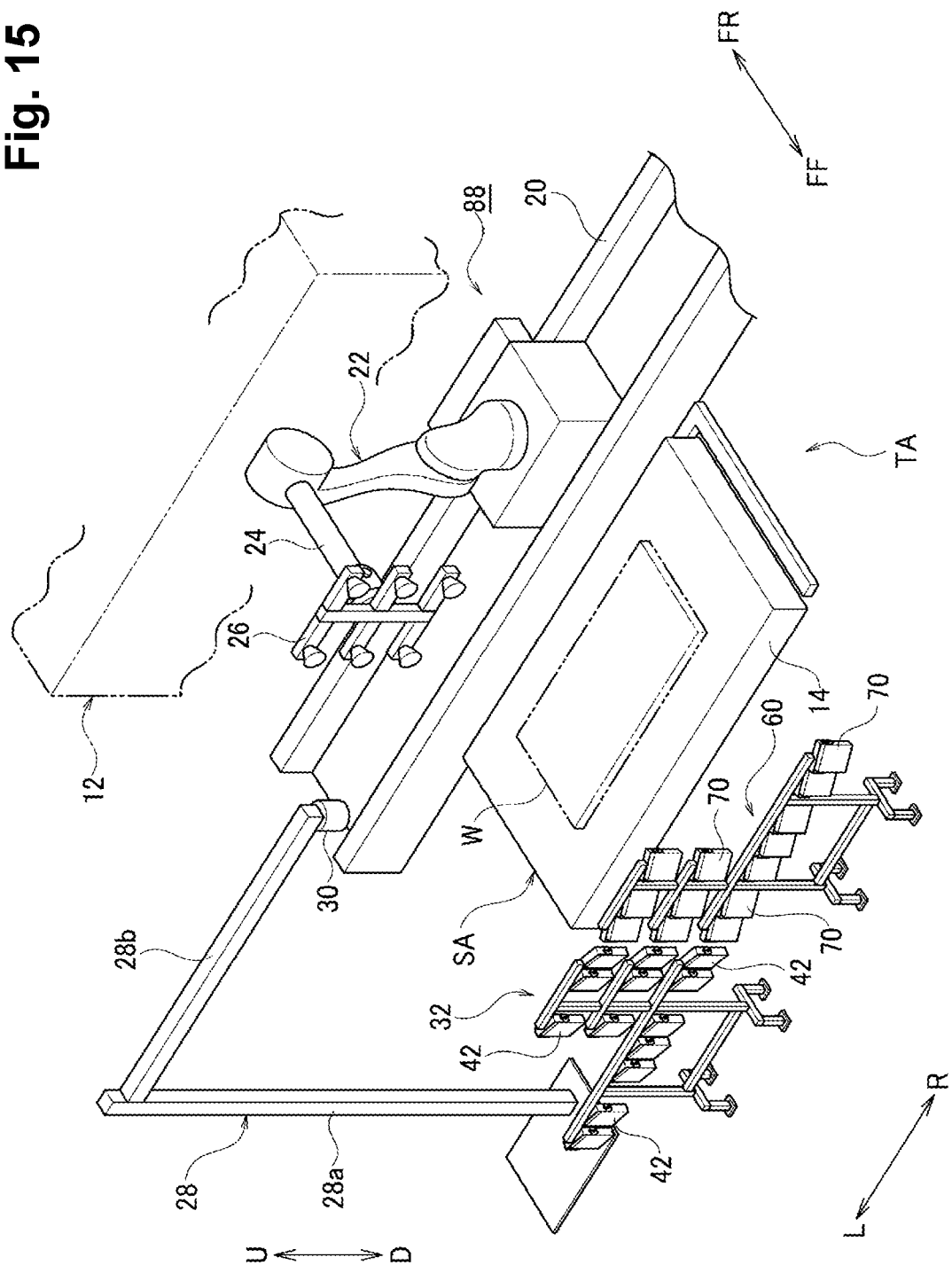
FIG. 15 is a perspective view of a bending system according to a second embodiment.
Figure 16:
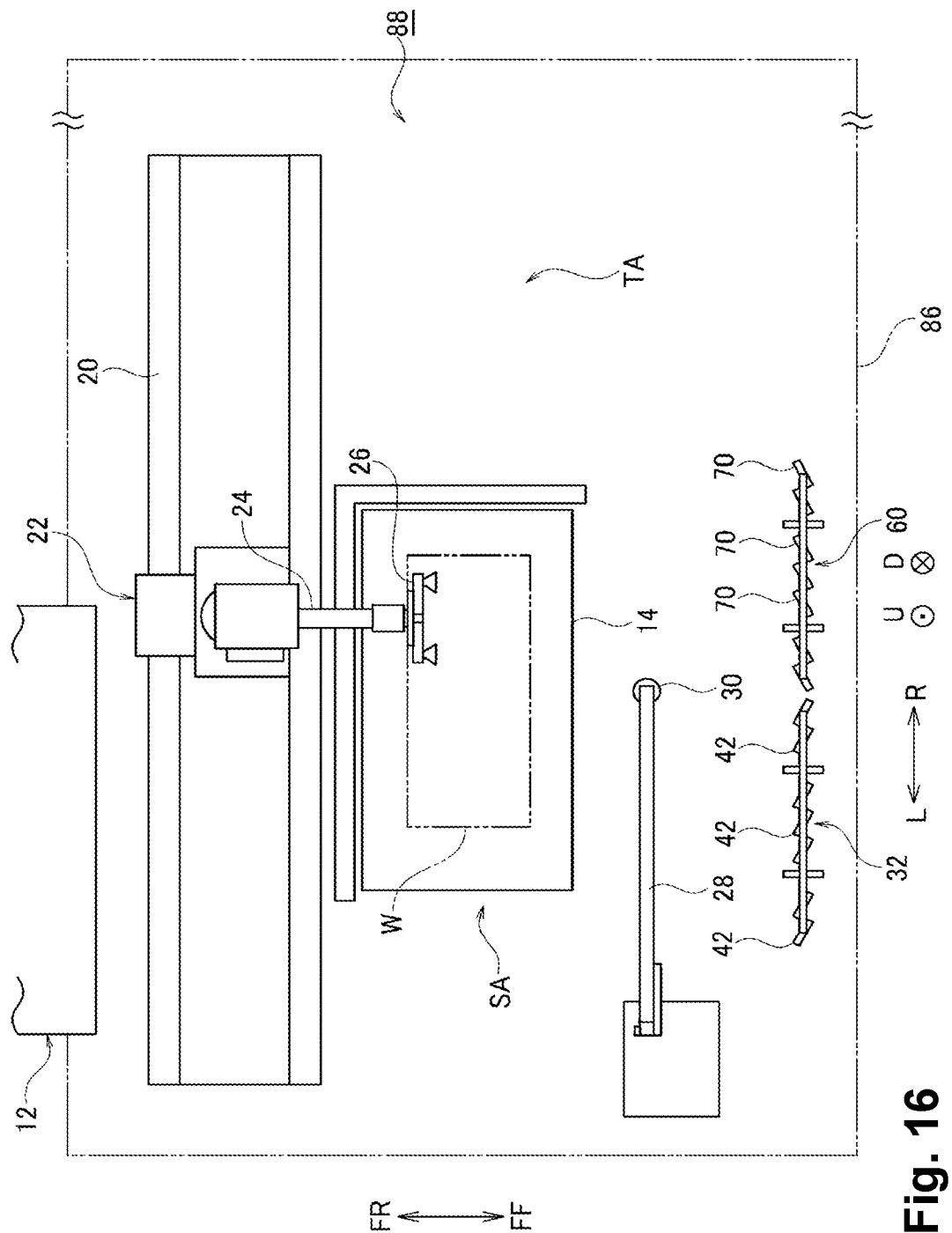
FIG. 16 is a plan view of the bending system according to the second embodiment.

As shown in FIGS. 15 to 17, a bending system 88 according to a second embodiment automatically bends the workpiece W in the same manner as the bending system 10 of the first embodiment (see FIG. 1). The bending system 88 has the same configurations as the bending system 10 except for a part, and of the configurations of the bending system 88, a configuration and the like different from those of the bending system 10 will be described. Note that of a plurality of constituent members of the bending system 88, those corresponding to the constituent members of the bending system 10 are denoted by the same reference numerals in the drawings.

The first illumination stand 32 that irradiates the image pickup area of the camera 30 with the illumination beam is erected on the left front side of the predetermined setting area SA. The first illumination stand 32 is arranged in parallel along the lateral direction. A second illumination stand 60 that irradiates the image pickup area of the camera 30 with the illumination beam is erected on the right front side of the predetermined setting area SA. The second illumination stand 60 is arranged in parallel along the lateral direction. Note that the first illumination stand 32 and the second illumination stand 60 may each has a caster attached with a brake (not shown). A first guard (not shown) that protects the first illumination stand 32 may be provided in the vicinity of the first illumination stand 32. A second guard (not shown) that protects the second illumination stand 60 may be provided in the vicinity of the second illumination stand 60.

Next, the operation and effect of the second embodiment will be described.

In the same manner as the operation of the first embodiment, the first illumination stand 32 and the second illumination stand 60 can be sufficiently separated from the predetermined setting area SA. Therefore, the workpiece W sucked by the part of the bending robot 22 or the robot hand 26 does not interfere with the camera 30, the first illumination stand 32, and the second illumination stand 60. In other words, the operating range of the bending robot 22 that sucks the workpiece W is not limited by the camera 30 or the like. Therefore, according to the second embodiment, it is possible to increase the degree of freedom of the bending of the bending system 88 while sufficiently ensuring the processing accuracy of the bending.

It should be noted that the present invention is not limited to the descriptions of several embodiments described above, and can be implemented in various other aspects by making appropriate changes. Then, the scope of rights included in the present invention is not limited to the embodiments described above.

The entire contents of Japanese Patent Application No. 2020-089699 (Filing date: May 22, 2020) are incorporated herein by reference.

The invention claimed is:

1. A bending system, comprising:
   a bending robot provided between a press brake and a predetermined setting area arranged in front of the press brake, including a robot hand for holding a workpiece on a pallet set in the predetermined setting area, and configured to assist in bending the workpiece;
   an image pickup unit provided above and in front of the predetermined setting area and configured to pick up an image of the workpiece on the pallet from an oblique upper direction;
   a first illumination unit erected on a left side and in front of the predetermined setting area and configured to irradiate an image pickup area of the image pickup unit with an illumination beam; and
   a second illumination unit erected on a right side and in front of the predetermined setting area and configured to irradiate the image pickup area of the image pickup unit with an illumination beam,
   wherein a taking-in and out passage is formed between the first illumination unit and the second illumination unit,
   wherein the first illumination unit is arranged to be inclined with respect to a lateral direction so that a right end side thereof is located more forward than a left end side thereof, and the second illumination unit is arranged to be inclined with respect to the lateral direction so that a left end side thereof is located more forward than a right end side thereof, and
   a safety fence is provided around the bending system.

2. The bending system according to claim 1, wherein
   the first illumination unit includes a plurality of first illuminations for irradiation of illumination beams in a right obliquely downward direction, and is configured such that an irradiation direction of each of the first illuminations is adjustable so that an entire area on the pallet is irradiated with the illumination beams from the plurality of first illuminations, and
   the second illumination unit includes a plurality of second illuminations for irradiation of illumination beams in a left obliquely downward direction, and is configured such that an irradiation direction of each of the second illuminations is adjustable so that the entire area on the pallet is irradiated with the illumination beams from the plurality of second illuminations.

3. The bending system according to claim 2, wherein
the first illumination unit includes a first support frame erected on a left side and in front of the predetermined setting area, and a plurality of first brackets provided rotatably around an axial center vertical to the first support frame, each of the first illuminations being provided rotatably around an axial center horizontal to each of the first brackets, and
the second illumination unit includes a second support frame erected on a right side and in front of the predetermined setting area, and a plurality of second brackets provided rotatably around an axial center vertical to the second support frame, each of the second illuminations being provided rotatably around an axial center horizontal to each of the second brackets.

4. The bending system according to claim 1, further comprising
a first guard provided in a vicinity of the first illumination unit and configured to protect the first illumination unit, and
a second guard provided in a vicinity of the second illumination unit and configured to protect the second illumination unit.

5. A method for using the bending system according to claim 2, comprising, in a state in which an entire area of the pallet is covered with an adjustment sheet, adjusting an irradiation direction of each of the first illuminations such that a position on the adjustment sheet is irradiated with a visible beam from a laser pointer of an adjustment jig mounted to each of the first illuminations, the position on the adjustment sheet corresponding to an irradiation range of a respective one of the first illuminations, and adjusting an irradiation direction of each of the second illuminations such that a position on the adjustment sheet is irradiated with a visible beam from a laser pointer of an adjustment jig mounted to each of the second illuminations, the position on the adjustment sheet corresponding to an irradiation range of a respective one of the second illuminations.

6. A method for using the bending system according to claim 2, comprising, when the image pickup unit picks up an image of the workpiece on the pallet from the oblique upper direction, executing an illumination operation of the first illumination unit so that the entire area on the pallet is irradiated with the illumination beams from the plurality of first illuminations, and executing an illumination operation of the second illumination unit so that the entire area on the pallet is irradiated with the illumination beams from the plurality of second illuminations.

7. The method for using the bending system, according to claim 6, further comprising staggering execution timings of the illumination operation of the first illumination unit and the illumination operation of the second illumination unit.

* * * * *